United States Patent
Li

(10) Patent No.: US 11,056,969 B2
(45) Date of Patent: Jul. 6, 2021

(54) BOOST CONVERTER SHORT CIRCUIT PROTECTION

(71) Applicant: TEXAS INSTRUMENTS INCORPORATED, Dallas, TX (US)

(72) Inventor: Linjue Li, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 216 days.

(21) Appl. No.: 16/110,596

(22) Filed: Aug. 23, 2018

(65) Prior Publication Data

US 2019/0312505 A1 Oct. 10, 2019

Related U.S. Application Data

(63) Continuation of application No. PCT/CN2018/082528, filed on Apr. 10, 2018.

(51) Int. Cl.
| | |
|---|---|
| *H02M 1/36* | (2007.01) |
| *H02M 1/08* | (2006.01) |
| *H02M 3/156* | (2006.01) |
| *H02H 3/087* | (2006.01) |
| *H02H 7/12* | (2006.01) |

(52) U.S. Cl.
CPC .............. *H02M 1/36* (2013.01); *H02H 3/087* (2013.01); *H02H 7/1213* (2013.01); *H02M 1/08* (2013.01); *H02M 3/156* (2013.01)

(58) Field of Classification Search
CPC .......... H02M 1/36; H02M 1/08; H02M 3/156; H02H 7/1213
See application file for complete search history.

(56) References Cited

U.S. PATENT DOCUMENTS

| | | | |
|---|---|---|---|
| 5,726,845 A | 3/1998 | Ho | |
| 8,134,849 B2* | 3/2012 | Chang | H02M 7/2176 363/89 |
| 9,419,431 B2* | 8/2016 | Prexl | H02M 3/1582 |
| 10,291,128 B1* | 5/2019 | Kwon | H02M 3/1588 |
| 2007/0216390 A1 | 9/2007 | Wai et al. | |

FOREIGN PATENT DOCUMENTS

| | | |
|---|---|---|
| CN | 206506287 U | 9/2017 |
| JP | H07194100 A | 7/1995 |

OTHER PUBLICATIONS

Search Report for PCT Application No. PCT/CN2018/082528, dated Jan. 4, 2019 (4 pages).

* cited by examiner

*Primary Examiner* — Scott Bauer
(74) *Attorney, Agent, or Firm* — Michelle F. Murray; Charles A. Brill; Frank D. Cimino

(57) ABSTRACT

A boost converter includes a voltage output terminal, a power transistor, and short circuit protection circuitry. The voltage output terminal is configured to provide a boosted output voltage generated by the boost converter. The power transistor is configured to draw current through an inductor. The short circuit protection circuitry is configured to control current flow through the inductor responsive to detection of a short circuit at the voltage output terminal. The short circuit protection circuitry includes an output switch coupled to an input terminal of the power transistor and connected to the voltage output terminal. The output switch is configured to switch current flow from the inductor to the voltage output terminal. The output switch is a negative (N) channel metal oxide semiconductor field effect transistor (MOSFET).

19 Claims, 3 Drawing Sheets

BOOST CONVERTER SHORT CIRCUIT PROTECTION

BACKGROUND

Boost converters are switch-mode power supplies that generate an output voltage that is higher than the input voltage. Boost converters are widely used in applications that operate with a low input voltage, such as battery powered applications. The boost converter produces the stepped up output voltage by switching to ground the output of an inductor coupled to the voltage input at a duty cycle selected to produce the boosted output voltage.

SUMMARY

Circuitry and a method for using a negative (N) channel metal oxide semiconductor field effect transistor (MOSFET) for short circuit protection in a boost converter. In one example, a boost converter includes an inductor connection terminal, a voltage output terminal, a power transistor, and a first N channel MOSFET. The power transistor includes an input terminal coupled to the inductor connection terminal, and an output terminal coupled a ground reference. The first N channel MOSFET includes a drain terminal coupled to the inductor connection terminal, and a source terminal coupled to the voltage output terminal.

In another example, a boost converter includes a voltage output terminal, a power transistor, and short circuit protection circuitry. The voltage output terminal is configured to provide a boosted output voltage generated by the boost converter. The power transistor is configured to draw current through an inductor. The short circuit protection circuitry is configured to control current flow through the inductor responsive to detection of a short circuit at the voltage output terminal. The short circuit protection circuitry includes an output switch coupled to an input terminal of the power transistor and connected to the voltage output terminal. The output switch is configured to switch current flow from the inductor to the voltage output terminal. The output switch is an N channel MOSFET.

In a further example, a method for boost converter short circuit protection includes determining whether there is a short circuit at a voltage output terminal of the boost converter. Responsive to determining that there is a short circuit at the voltage output terminal, a first N channel MOSFET that draws current from an inductor is turned off, and a second N channel MOSFET that is connected to the voltage output terminal and couples the inductor to the voltage output terminal is turned off.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

If a boost converter lacks output short circuit protection, a short to ground on the output terminal of the boost converter can short the boost converter input voltage to ground through the inductor and other uncontrolled components in the path between the converters input and output voltage terminals. Under such conductions, the inductor, conductors, and/or other components of the boost converter may be damaged. Boost converter output short circuit protection includes adding a switching device between the inductor and the boost converter output terminal. Some implementations add a positive (P) channel metal oxide semiconductor field effect transistor (MOSFET) between the inductor and the boost converter output terminal, and circuitry to detect output short circuits and control the P channel MOSFET responsive to detected short. P channel MOSFETs are relatively easy to control, but are less efficient than negative (N) channel MOSFETs of equivalent size.

The boost converters and associated control circuitry disclosed herein include an N channel MOSFET as an over current protection switch between the inductor and the output voltage terminal of the boost converter. Because fully opening the over current protection switch immediately on detection of an output short circuit may cause a high voltage transient (due to an increase in voltage as the inductor discharges) that can damage components of the boost converter, the circuitry controlling the operation of the N channel MOSFET allows for current to flow from the inductor through the N channel MOSFET until the voltage across the inductor is substantially zero. Thereafter, the N channel MOSFET is fully turned off to isolate the boost converter from the short circuit.

Figure 1:
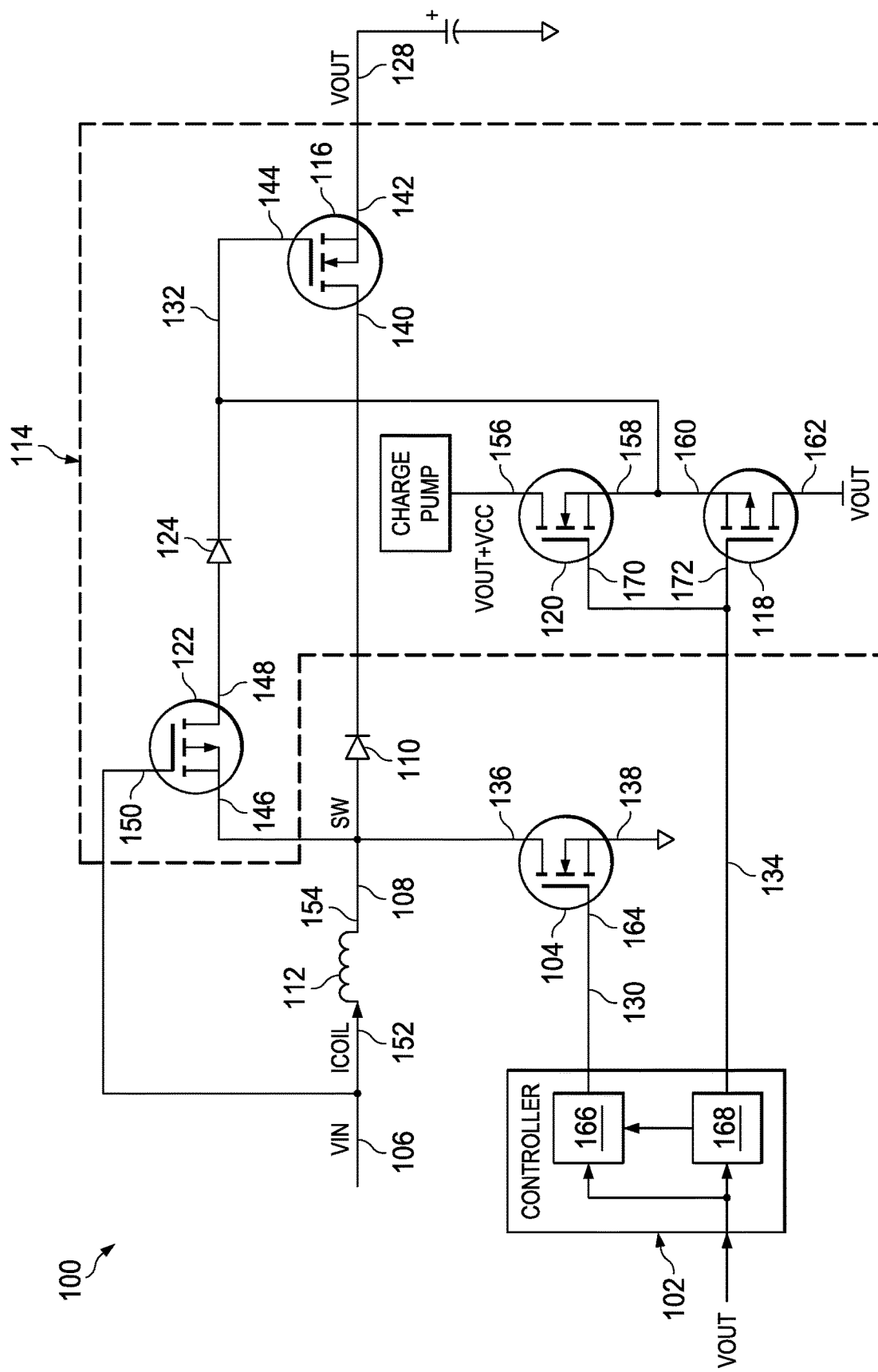
FIG. 1 shows an example of a boost converter that includes a negative (N) channel metal oxide semiconductor field effect transistor (MOSFET) for output voltage short circuit protection in accordance with the present disclosure.

FIG. 1 shows an example of a boost converter 100 that includes an N channel MOSFET for output voltage short circuit protection in accordance with the present disclosure. The boost converter 100 includes a controller 102, a power transistor 104, an voltage input terminal 106, an inductor connection terminal 108, a diode 110, an inductor 112, short circuit protection circuitry 114, and a voltage output terminal 128. The power transistor 104 may be an N channel MOSFET or a bipolar transistor capable of conducting substantial current. The power transistor 104 includes a control terminal (e.g., a gate terminal) 164 that is coupled to the controller 102, an input terminal (e.g., a drain terminal) 136 that is coupled to the inductor connection terminal 108, and an output terminal (e.g., a source terminal) 138 that is coupled to ground.

The controller 102 includes pulse generation circuitry 166 that generates a pulse signal 130 to turn the power transistor 104 on and off. For example, the pulse generation circuitry 166 may include pulse width modulation circuitry or pulse frequency modulation circuitry that generates the pulse signal 130 based on a comparison of voltage at the voltage output terminal 128 to a reference voltage (e.g., a voltage generated by a band-gap circuit of the controller 102). The pulse generation circuitry 166 is coupled to the control terminal 164 of the power transistor 104. The controller 102 also includes short circuit detection circuitry 168 that detects a short circuit at the voltage output terminal 128. For example, the short circuit detection circuitry 168 may include a comparator that compares the voltage at the voltage output terminal 128 to the voltage at the voltage input terminal 106. If the voltage at the voltage output terminal 128 falls below the voltage at the voltage input terminal 106, then a short circuit may be present at the voltage output terminal 128. When a short circuit at the voltage output terminal 128 is detected, the controller 102 may turn off the power transistor 104.

The inductor 112 includes a terminal 152 that is coupled to the voltage input terminal 106 and a terminal 154 that is coupled to the inductor connection terminal 108. When turned on, the power transistor 104 induces current flow in the inductor 112. When the power transistor 104 is turned off the magnetic field about the inductor 112, produced by current flow while the power transistor 104 is turned on, collapses and the voltage at the inductor connection terminal 108 rises above the voltage at the voltage input terminal 106. The diode 110 couples the inductor connection terminal 108 to the short circuit protection circuitry 114. In some implementations of the boost converter 100, the diode 110 may be replaced by an N channel MOSFET.

The short circuit protection circuitry 114 includes an N channel MOSFET 116 (also referred to herein as an "output switch"), a P channel MOSFET 118, an N channel MOSFET 120, a P channel MOSFET 122 (also referred to herein as a "control transistor"), and a diode 124. When no short circuit is present at the output of the boost converter 100, the N channel MOSFET 116 is fully turned on to provide a path for current flow from the inductor connection terminal 108, via the diode 110, to the voltage output terminal 128. When a short circuit is detected at the voltage output terminal 128, the N channel MOSFET 116 operates as an output switch to protect the boost converter 100. The N channel MOSFET 116 protects the boost converter during an output short in two ways. First, on detection of a short at the voltage output terminal 128, turn-off of the N channel MOSFET 116 is initiated, but the N channel MOSFET 116 is kept partially on to allow the inductor 112 to discharge through the N channel MOSFET 116. By providing a path for discharge of the inductor 112, the N channel MOSFET 116 prevents a high-voltage transient at the inductor connection terminal 108 that may damage components of the boost converter 100. The time required to discharge the inductor 112 may be in a range of a few milliseconds. Finally, after the inductor 112 has been discharged the N channel MOSFET 116 is fully turned off to prevent flow of current through the inductor 112 to the voltage output terminal 128 thereby isolating the boost converter 100 from the short circuit at the voltage output terminal 128.

The N channel MOSFET 116 includes an input terminal (e.g., a drain terminal) 140 that is coupled to the inductor connection terminal 108 via the diode 110, and an output terminal (e.g., a source terminal) 142 that is coupled to the voltage output terminal 128. The N channel MOSFET 116 is controlled by the P channel MOSFET 118, the N channel MOSFET 120, and the P channel MOSFET 122.

The P channel MOSFET 118 and the N channel MOSFET 120 are connected to form a pull-up/pull-down circuit that drives the control terminal 144 of the N channel MOSFET 116. Because the impedance of the control terminal 144 of the N channel MOSFET 116 is relatively high, the P channel MOSFET 118 and the N channel MOSFET 120 may be relatively weak drivers. The P channel MOSFET 118 (low-side transistor) and the N channel MOSFET 120 (high-side transistor) are controlled by a signal 134 generated by the controller 102. The signal 134 may be generated based on the state of the voltage output terminal 128 as determined by the short circuit detection circuitry 168 of the controller 102. A control terminal (e.g., a gate terminal) 172 of the P channel MOSFET 118 and a control terminal (e.g., a gate terminal) 170 of the N channel MOSFET 120 are coupled to the short circuit detection circuitry 168.

When no short is detected at the voltage output terminal 128, the signal 134 turns on the N channel MOSFET 120 and turns off the P channel MOSFET 118. An input terminal (e.g., a source terminal) 160 of the P channel MOSFET 118 is coupled to an output terminal (e.g., a source terminal) 158 of the N channel MOSFET 120. The input terminal 160 of the P channel MOSFET 118 and the output terminal 158 of the N channel MOSFET 120 are coupled to the control terminal (e.g., gate terminal) 144 of the N channel MOSFET 116. When turned on, the N channel MOSFET 120 drives the control signal 132, the control voltage applied to the N channel MOSFET 116, to a voltage higher than the voltage at the voltage output terminal 128 to turn on the N channel MOSFET 116. For example, the boost converter 100 may include a charge pump that generates a voltage higher than the voltage at the voltage output terminal 128 when no short is present at the output terminal 128. An input terminal (e.g., a drain terminal) 156 of the N channel MOSFET 120 is coupled to the charge pump.

When a short at the voltage output terminal 128 is detected, the signal 134 turns on the P channel MOSFET 118 and turns off the N channel MOSFET 120. When the N channel MOSFET 120 is turned off, and the P channel MOSFET 118 is turned on, the P channel MOSFET 118 drives the control signal 132 to the voltage present on the voltage output terminal 128 to turn off the N channel MOSFET 116. An output terminal (e.g., a drain terminal) 162 of the P channel MOSFET 118 is coupled to the voltage output terminal 128. Because the P channel MOSFET 118 may be relatively small and weak, the P channel MOSFET 118 may turn off the N channel MOSFET 116 relatively slowly. Some implementations of the short circuit protection circuitry 114 may include an N channel MOSFET as a pull-down and/or include a P channel MOSFET as a pull-up.

If on detection of a short circuit at the voltage output terminal 128, the N channel MOSFET 116 is abruptly turned off (i.e., current flow from the inductor 112 to the voltage output terminal 128 is abruptly decreased), then in accordance with the inductor voltage equation $$\left(v = L\frac{di}{dt}\right)$$

the voltage at the inductor connection terminal 108 may rise to a voltage that can damage the boost converter 100 as the inductor 112 discharges. To prevent a high-voltage transient at the inductor connection terminal 108, the P channel MOSFET 122 keeps the N channel MOSFET 116 on while the inductor 112 is discharging (e.g., while the voltage at the inductor connection terminal 108 exceeds the voltage at the voltage input terminal 106). A control terminal (e.g., gate terminal) 150 of the P channel MOSFET 122 is coupled to the voltage input terminal 106. An input terminal (e.g., a source terminal) 146 of the P channel MOSFET 122 is coupled to the inductor connection terminal 108. An output terminal (e.g., drain terminal) of the P channel MOSFET 122 is coupled to the control terminal of the N channel MOSFET 116 via a diode 124.

When the controller 102 detects a short at the voltage output terminal 128, the controller 102 turns off the power transistor 104 and the N channel MOSFET 120, and turns on the P channel MOSFET 118, which starts to turn off the N channel MOSFET 116. The change in current flow in the inductor 112 caused by turning off the power transistor 104 and partially turning off the N channel MOSFET 116 causes the voltage at the inductor connection terminal 108 (and the input terminal 146 of the P channel MOSFET 122) to increase as the inductor 112 discharges. When the voltage at the inductor connection terminal 108 exceeds the voltage at the voltage input terminal 106 by the threshold voltage of the P channel MOSFET 122, the P channel MOSFET 122 turns on and allows transient current to flow (i.e., routes current) from the inductor connection terminal 108 to the control terminal 144 of the N channel MOSFET 116, thereby turning on the N channel MOSFET 116 (e.g., preventing the N channel MOSFET 116 from being fully turned off by the P channel MOSFET 118). As the inductor 112 discharges, and the inductor current decreases to zero (see FIG. 2), the voltage at the inductor connection terminal 108 falls to about the voltage at the voltage input terminal 106 (e.g., the voltage across the inductor 112 falls below the threshold voltage of the P channel MOSFET 122), and the P channel MOSFET 122 turns off. When the P channel MOSFET 122 turns off, the N channel MOSFET 116 is turned off via the pull-down provided by the P channel MOSFET 118. Thus, the P channel MOSFET 122 controls the N channel MOSFET 116 during a short event to allow the inductor 112 to discharge while protecting the boost converter 100 from overcurrent damage.

In some implementations, the controller 102, the power transistor 104, the voltage input terminal 106, the inductor connection terminal 108, the diode 110, the short circuit protection circuitry 114, and the output terminal output terminal may be components of a same integrated circuit.

Figure 2:
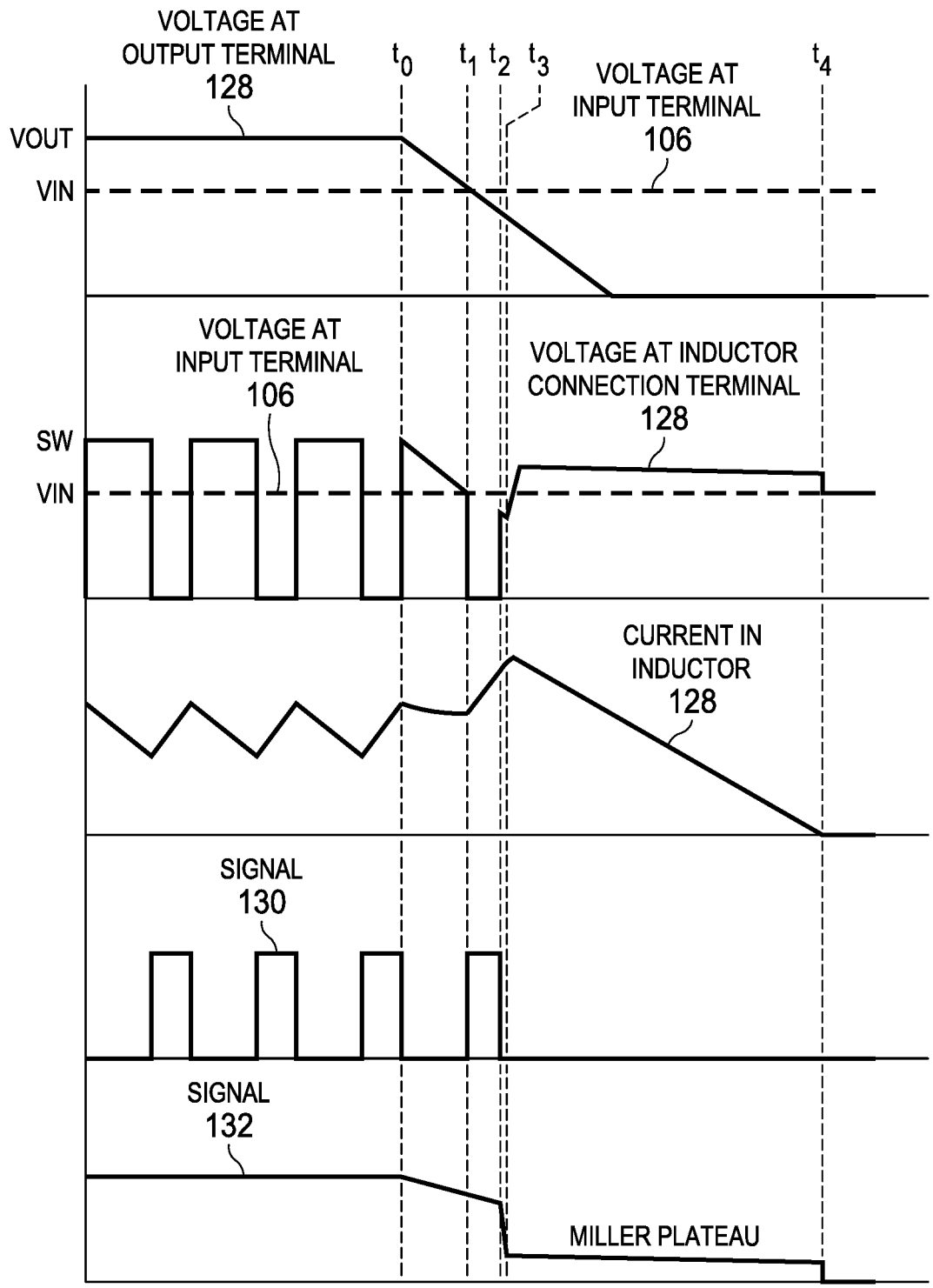
FIG. 2 shows a timing diagram for operation of a boost converter that includes an N channel MOSFET for output voltage short circuit protection in accordance with the present disclosure.

FIG. 2 shows a timing diagram for operation of examples of the boost converter boost converter 100 in accordance with the present disclosure. In FIG. 2, prior to time $t_0$, the boost converter 100 is operating with no short circuit present at the voltage output terminal 128. The pulses on the pulse signal 130 cause the power transistor 104 to switch, the voltage at the inductor connection terminal 108 exceeds the voltage at the voltage input terminal 106 while the power transistor 104 is turned off, and the voltage at the voltage output terminal 128 exceeds the voltage at the voltage input terminal 106. At time $t_0$, the voltage output terminal 128 is shorted to ground and the voltage at the voltage output terminal 128 begins to drop towards ground. At time $t_1$, the voltage at the voltage output terminal 128 has dropped to equal the voltage at the voltage input terminal 106, and at time $t_2$ the short circuit detection circuitry 168 of the controller 102 detects the short circuit. Responsive to detection of the short circuit by the short circuit detection circuitry 168, the pulse generation circuitry 166 discontinues generation pulses on the pulse signal 130 to turn off the power transistor 104, and the short circuit detection circuitry 168 sets the signal 134 to turn on the P channel MOSFET 118 and turn off the N channel MOSFET 120. Because the falling time of the control signal 132 is longer than the falling time of the pulse signal 130, current flowing in the inductor 112 flows through the diode 110 and the N channel MOSFET 116 between time $t_2$ and time $t_3$. The voltage at the inductor connection terminal 108 is equal to the voltage at the voltage output terminal 128 between time $t_2$ and time $t_3$.

After time $t_3$, the voltage of the control signal 132 decreases to the Miller plateau voltage of the N channel MOSFET 116, and the voltage at the inductor connection terminal 108 increases. When the voltage at the inductor connection terminal 108 exceeds the voltage at the voltage input terminal 106 by at least the threshold voltage of the P channel MOSFET 122, the P channel MOSFET 122 turns on. Because the drain-source resistance of the P channel MOSFET 122 is substantially smaller than the drain-source resistance of the P channel MOSFET 118, the voltage of the control signal 132 stays at about the Miller plateau voltage of the P channel MOSFET 122 until no current is flowing in the inductor 112 (i.e., the voltage across the inductor 112 is substantially zero (e.g., within a threshold voltage of the P channel MOSFET 122 of zero volts)) at time $t_4$. Thereafter, the P channel MOSFET 122 and the N channel MOSFET 116 turn off.

Figure 3:
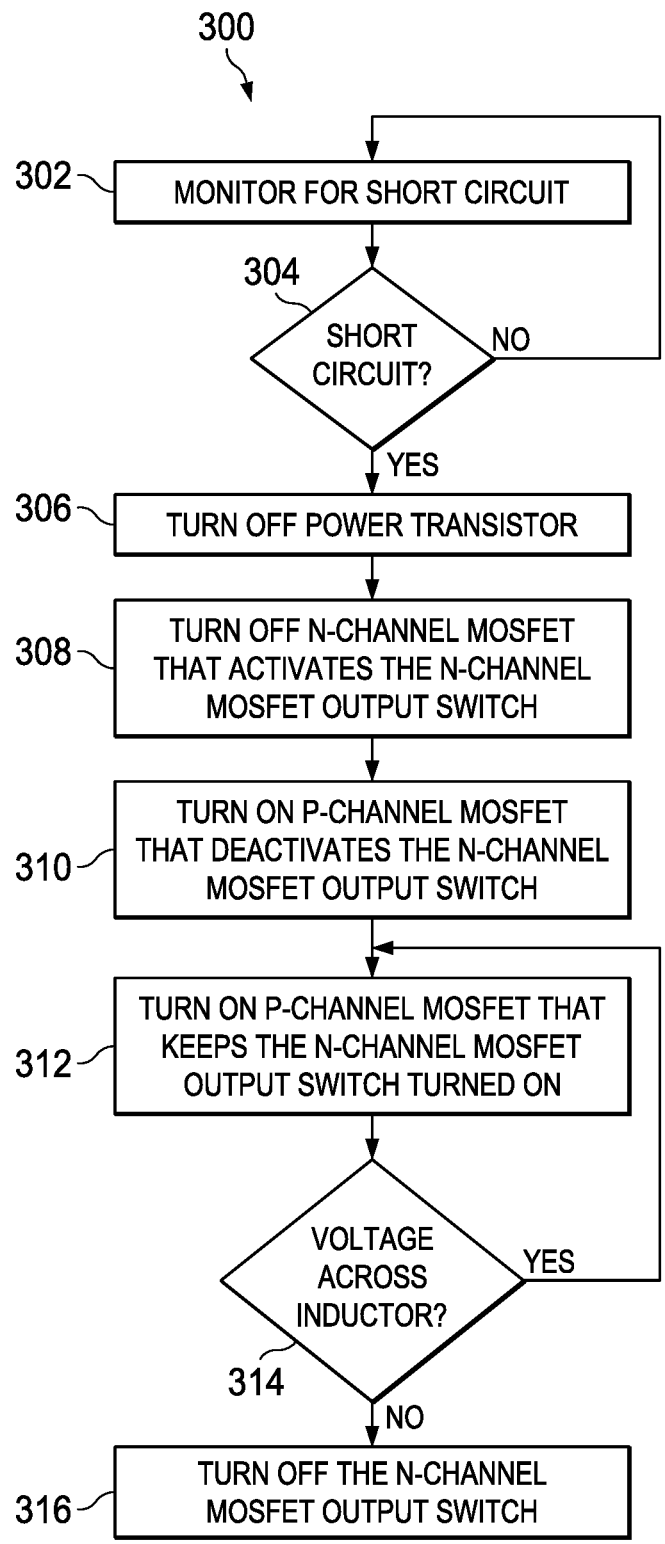
FIG. 3 shows a flow diagram for a method for using an N channel MOSFET for output voltage short circuit protection in a boost converter in accordance with the present disclosure.

FIG. 3 shows a flow diagram for a method 300 for using an N channel MOSFET for output voltage short circuit protection in a boost converter in accordance with the present disclosure. Though depicted sequentially as a matter of convenience, at least some of the actions shown can be performed in a different order and/or performed in parallel. Additionally, some implementations may perform only some of the actions shown. Operations of the method 300 may be performed by implementations of the boost converter 100.

In block 302, the boost converter 100 is operating. The voltage at the voltage output terminal 128 exceeds the voltage at the voltage input terminal 106, and the short circuit detection circuitry 168 is monitoring the voltage at the voltage output terminal 128 to detect a short circuit. For example, the short circuit detection circuitry 168 may compare the voltage at the voltage output terminal 128 to the voltage at the voltage input terminal 106, and identify a short circuit at the voltage output terminal 128 as being present if the voltage at the voltage input terminal 106 exceeds the voltage at the voltage output terminal 128.

In block 304, if a short circuit has not been detected at the voltage output terminal 128 (e.g., the voltage at the voltage output terminal 128 exceeds the voltage at the voltage input terminal 106), then monitoring for a short circuit continues in block 302.

If, in block 304, a short circuit has been detected (e.g., the voltage at the voltage input terminal 106 exceeds the voltage at the voltage output terminal 128), then, in block 306, the power transistor 104 is turned off. For example, the pulse generation circuitry 166 discontinues pulse generation and sets the pulse signal 130 to deactivate the power transistor 104.

In block 308, the N channel MOSFET 120 is turned off. For example, the signal 134 is set to deactivate the N channel MOSFET 120.

In block 310, the P channel MOSFET 118 is turned on. For example, setting the signal 134 to deactivate the N channel MOSFET 120 sets the signal 134 to activate the P channel MOSFET 118. Turning on the P channel MOSFET 118 pulls the control terminal 144 of the N channel MOSFET 116 towards the voltage at the voltage output terminal 128 to turn off the N channel MOSFET 116.

In block 312, after the power transistor 104 is turned off, the voltage at the inductor connection terminal 108 increases, and when the voltage at the inductor connection terminal 108 exceeds the voltage at the voltage input terminal 106 by at least the threshold voltage of the P channel MOSFET 122, the P channel MOSFET 122 is turned on and current flows from the inductor connection terminal 108 to the control terminal 144 of the N channel MOSFET 116 turning on the N channel MOSFET 116.

In block 314, if the voltage across the inductor 112 is not zero, then the P channel MOSFET 122 and the N channel MOSFET 116 remain on in block 312 to discharge the inductor 112 through the N channel MOSFET 116.

If in block 314, the voltage across the inductor 112 is zero, then the P channel MOSFET 122 and the N channel MOSFET 116 are turned off.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A circuit, comprising:
   a power transistor having a first drain, a first source, and a first gate;
   a negative (N) channel metal oxide semiconductor field effect transistor (MOSFET) having a second drain, a second source, and a second gate, the second drain coupled to the first source; and
   a positive (P) channel MOSFET having a third source, a third drain, and a third gate, the third source coupled to the first source and the third drain coupled to the second gate.

2. The circuit of claim 1, further comprising a diode coupled between the third drain and the second gate.

3. The circuit of claim 2, wherein the third gate is coupled to a voltage input terminal.

4. The circuit of claim 3, further comprising an inductor having a first inductor terminal and a second inductor terminal, the first inductor terminal coupled to the first source and the second inductor terminal coupled to the voltage input terminal.

5. The circuit of claim 1, wherein the N channel MOSFET is a first N channel MOSFET, and the circuit further comprises a second N channel MOSFET having a fourth source, a fourth drain, and a fourth gate, the fourth drain coupled to a charge pump and the fourth source coupled to the second gate.

6. The circuit of claim 5, wherein the P channel MOSFET is a first P channel MOSFET, the circuit further comprising a second P channel MOSFET having a fifth source, a fifth drain, and a fifth gate, the fifth source coupled to the second gate and the fifth drain coupled to a voltage input terminal.

7. The circuit of claim 6, further comprising a controller, the controller comprising:
   pulse generation circuitry coupled to the first gate;
   short circuit detection circuit coupled to:
      the pulse generation circuitry;
      a voltage output terminal;
      the fourth gate; and
      the fifth gate.

8. The circuit of claim 1, further comprising a diode coupled between the first source and the second drain.

9. The circuit of claim 1, wherein the first drain is coupled to a ground terminal and the second source is coupled to a voltage output terminal.

10. A circuit, comprising:
    a power transistor configured to draw current through an inductor; and
    short circuit protection circuitry configured to control current through the inductor responsive to detecting a short circuit at a voltage output terminal, the short circuit protection circuitry comprising:
       a negative (N) channel metal oxide semiconductor field effect transistor (MOSFET) coupled to of the power transistor and to the voltage output terminal, the N channel MOSFET configured to switch current from the inductor to the voltage output terminal; and
       a control transistor coupled to the N channel MOSFET, the control transistor configured to route current from the inductor to the N channel MOSFET.

11. The circuit of claim 10, wherein the control transistor is configured to activate the N channel MOSFET, responsive to of detecting the short circuit, until a voltage across the inductor is substantially equal to zero.

12. The circuit of claim 10, further comprising a voltage input terminal coupled to a control terminal of the control transistor; wherein the voltage input terminal is adapted to be coupled to the inductor.

13. The circuit of claim 10, further comprising a pull-up/pull-down circuit configured to control the N channel MOSFET, the pull-up/pull-down circuit having an output coupled to a control terminal of the N channel MOSFET.

14. The circuit of claim 13, further comprising a controller configured to:
    detect the short circuit at the voltage output terminal of the circuit; and
    turn off the power transistor responsive to detecting the short circuit.

15. The circuit of claim 14, wherein the pull-up/pull-down circuit comprises:
    a high-side transistor; and
    a low-side transistor;
    wherein the controller is configured to:
       turn on the low-side transistor responsive to detecting the short circuit at the voltage output terminal; and
       turn on the high-side transistor responsive to detecting a lack of short circuit at the voltage output terminal.

16. A circuit comprising:
    a first negative (N) channel metal oxide semiconductor field effect transistor (MOSFET) having a first drain, a first source, and a first gate;
    a positive (P) channel MOSFET having a second drain, a second source, and a second gate, the second drain coupled to the first gate; and
    a second N channel MOSFET having a third drain, a third source, and a third gate, the third source coupled to the first gate.

17. The circuit of claim 16, wherein the P channel MOSFET is a first P channel MOSFET, the circuit further comprising a second P channel MOSFET having a fourth drain, a fourth source, and a fourth gate, the fourth source coupled to the first gate and the fourth gate coupled to the third gate.

18. The circuit of claim 16, further comprising a diode coupled between the second drain and the first gate.

19. The circuit of claim 16, further comprising a charge pump coupled to the third drain.

* * * * *